United States Patent
Leleannec et al.

(10) Patent No.: US 11,006,116 B2
(45) Date of Patent: May 11, 2021

(54) METHOD AND DEVICE FOR CONTEXT-ADAPTIVE BINARY ARITHMETIC CODING A SEQUENCE OF BINARY SYMBOLS REPRESENTING A SYNTAX ELEMENT RELATED TO PICTURE DATA

(71) Applicant: INTERDIGITAL VC HOLDINGS, INC., Wilmington, DE (US)

(72) Inventors: Fabrice Leleannec, Mouaze (FR); Gagan Rath, Rennes (FR); Fabrice Urban, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/340,064

(22) PCT Filed: Aug. 31, 2017

(86) PCT No.: PCT/EP2017/071847
§ 371 (c)(1),
(2) Date: Apr. 5, 2019

(87) PCT Pub. No.: WO2018/065154
PCT Pub. Date: Apr. 12, 2018

(65) Prior Publication Data
US 2020/0045316 A1  Feb. 6, 2020

(30) Foreign Application Priority Data

Oct. 5, 2016 (EP) .................................. 16306307

(51) Int. Cl.
*H04N 19/13* (2014.01)
*H04N 19/147* (2014.01)
(Continued)

(52) U.S. Cl.
CPC ........... *H04N 19/13* (2014.11); *H04N 19/147* (2014.11); *H04N 19/172* (2014.11); *H04N 19/18* (2014.11)

(58) Field of Classification Search
None
See application file for complete search history.

(56) References Cited

U.S. PATENT DOCUMENTS 6,900,748 B2    5/2005  Marpe et al.
8,254,455 B2 *  8/2012  Wu ........................ H04N 19/61
                                              375/240.16
(Continued)

FOREIGN PATENT DOCUMENTS

AU    2015202670 A1    6/2015
CN    102769744 A     11/2012
(Continued)

OTHER PUBLICATIONS

Sole et al., "Transform Coefficient Coding in HEVC", IEEE Transactions on Circuits and Systems for Video Technology, vol. 22, No. 12, Dec. 2012, pp. 1765-1777. (Year: 2012).*

(Continued)

*Primary Examiner* — Reza Aghevli
(74) *Attorney, Agent, or Firm* — Invention Mine LLC

(57) ABSTRACT

The present principles relate to a method an device for context-adaptive binary arithmetic coding/decoding a sequence of binary symbols representing a syntax element related to picture data belonging to a picture block. Said method comprising, for each binary symbol of the sequence of binary symbols: —determining (110) a context according to the size of the picture block and the binary symbol to be coded; and —arithmetic-coding/decoding (120) said binary symbol taking into account said determined context; characterized in that said determining (110) of a context comprises: —when the size of said picture block is a power of (Continued)

2, determining (910) a context according to the size of said picture block; and —when the size of said picture block is not a power of 2, determining (920) a context according to a block size immediately higher or lower than the size of said picture block, said block size being equal to a power of 2.

20 Claims, 10 Drawing Sheets

(51) Int. Cl.
*H04N 19/172* (2014.01)
*H04N 19/18* (2014.01)

(56) References Cited

U.S. PATENT DOCUMENTS

| | | | |
|---|---|---|---|
| 8,265,144 B2* | 9/2012 | Christoffersen | H04N 19/61 375/240.1 |
| 8,902,988 B2* | 12/2014 | Sole Rojals | H04N 19/146 375/240.18 |
| 8,913,666 B2* | 12/2014 | Sole Rojals | H04N 19/64 375/240.18 |
| 8,934,540 B2* | 1/2015 | Chen | H03M 7/40 375/240.03 |
| 9,554,134 B2* | 1/2017 | Sermadevi | H04N 19/15 |
| 9,648,325 B2* | 5/2017 | Baeza | H04N 19/124 |
| 9,769,475 B2* | 9/2017 | Zhang | H04N 19/615 |
| 9,819,970 B2* | 11/2017 | Sermadevi | H04N 19/82 |
| 2007/0040710 A1 | 2/2007 | Tomic | |
| 2007/0071090 A1 | 3/2007 | Peng et al. | |
| 2009/0002379 A1* | 1/2009 | Baeza | H04N 19/436 345/522 |
| 2009/0003446 A1* | 1/2009 | Wu | H04N 19/587 375/240.16 |
| 2009/0003447 A1* | 1/2009 | Christoffersen | H04N 19/192 375/240.16 |
| 2009/0028247 A1* | 1/2009 | Suh | H04N 21/4382 375/240.25 |
| 2011/0176743 A1 | 7/2011 | Sankar et al. | |
| 2013/0003824 A1* | 1/2013 | Guo | H04N 19/122 375/240.03 |
| 2013/0107942 A1* | 5/2013 | Chen | H04N 19/66 375/240.03 |
| 2013/0287114 A1* | 10/2013 | Arevalo Baeza | H04N 19/105 375/240.17 |
| 2014/0098887 A1* | 4/2014 | Sermadevi | H04N 19/436 375/240.18 |
| 2014/0098890 A1* | 4/2014 | Sermadevi | H04N 19/15 375/240.24 |
| 2014/0286409 A1* | 9/2014 | Zhang | H04N 19/615 375/240.12 |
| 2016/0044308 A1 | 2/2016 | Jacobson et al. | |
| 2017/0244968 A1* | 8/2017 | Ray | H04N 19/159 |

FOREIGN PATENT DOCUMENTS

| | | |
|---|---|---|
| CN | 103733627 A | 4/2014 |
| CN | 104081777 A | 10/2014 |
| CN | 104205830 A | 12/2014 |
| CN | 104205835 A | 12/2014 |
| WO | 2008061008 A3 | 7/2008 |
| WO | WO-2013006446 A1 * | 1/2013 .......... H04N 19/129 |
| WO | WO 2013006446 A1 | 1/2013 |

OTHER PUBLICATIONS

Sole et al., "Transform Coefficient Coding in HEVC", IEEE Trans. on Circuits and Systems for Video Technology, vol. 22, No. 12, Dec. 2012, pp. 1765-1777 (Year: 2012).*

Chen et al., "Algorithm Description of Joint Exploration Test Model 3 (JEM3)", Joint Video Exploration Team (JVET) of ITU-T SG16 WP3 and ISO/IEC JTC1/SC29/WG11, Document: JVET-C1001 v3, 3rd Meeting, Geneva, Switzerland, May 26, 2016, 37 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.

Suehring et al., "JVET Common Test Conditions and Software Reference Configurations", Joint Video Exploration Team (JVET) of ITU-T SG16 WP3 and ISO/IEC JTC1/SC29/WG11, Document: JVET-B1010, 2nd Meeting, San Diego, California, USA, Feb. 20, 2016, 4 pages.

Sole et al., "Transform Coefficient Coding in HEVC", IEEE Transactions on Circuits and Systems for Video Technology, vol. 22, No. 12, Dec. 2012, pp. 1765-1777.

Anonymous, "Advanced video coding for generic audiovisual services", International Telecommunication Union, ITU-T Telecommunication Standardization Sector of ITU, Series H: Audiovisual and Multimedia Systems, Infrastructure of audiovisual services—Coding of moving video, Recommendation ITU-T H.264, Feb. 2014, pp. 1-790.

Chen et al., "Algorithm Description of Joint Exploration Test Model 1", Joint Video Exploration Team (JVET) of ITU-T SG16 WP3 and ISO/IEC JTC1/SC29/WG11, Document: JVET-A1001, 1st Meeting, Geneva, Switzerland, Oct. 19, 2015, 27 pages.

Marpe, D., et al. "Context-based adaptive binary arithmetic coding in the H. 264/AVC video compression standard." IEEE Transactions on circuits and systems for video technology vol. 13, No. 7, Jul. 2003. pp. 620-636.

* cited by examiner

| Position | prefix<br>Truncated unary<br>(regular mode) | suffix<br>Fixed length<br>(bypass mode) | Suffix Range |
|---|---|---|---|
| 0 | 0 | — | — |
| 1 | 10 | — | — |
| 2 | 110 | — | — |
| 3 | 1110 | — | — |
| 4-5 | 11110 | X | 0 to 1 |
| 6-7 | 111110 | X | 0 to 1 |
| 8-11 | 1111110 | XX | 0 to 3 |
| 12-15 | 11111110 | XX | 0 to 3 |
| 16-23 | 111111110 | XXX | 0 to 7 |
| 24-31 | 111111111 | XXX | 0 to 7 |

| Bin Index | 0 | 1 | 2 | 3 | 4 | 5 | 6 | 7 | 8 |
|---|---|---|---|---|---|---|---|---|---|
| T | | | | | Luma | | | | |
| 3 | 0 | 1 | | | | | | | |
| 4 | 0 | 1 | 2 | | | | | | |
| 6 | 0 | 1 | 2 | 3 | | | | | |
| 8 | 3 | 3 | 4 | 4 | 5 | | | | |
| 12 | 3 | 3 | 4 | 4 | 5 | 5 | 9 | | |
| 16 | 6 | 6 | 7 | 7 | 8 | 8 | 9 | 9 | |
| 24 | 6 | 6 | 7 | 7 | 8 | 8 | 9 | 13 | 14 |
| 32 | 10 | 10 | 11 | 11 | 12 | 12 | 13 | | |
| T | | | | | Chroma | | | | |
| 3 | 15 | 16 | | | | | | | |
| 4 | 15 | 16 | 17 | 18 | | | | | |
| 6 | 15 | 16 | 17 | 16 | 17 | | | | |
| 8 | 15 | 15 | 16 | 16 | 17 | 16 | 16 | | |
| 12 | 15 | 15 | 16 | 16 | 16 | 16 | 16 | 16 | |
| 16 | 15 | 15 | 15 | 15 | 16 | 16 | 16 | 16 | |
| 24 | 15 | 15 | 15 | 15 | 16 | 16 | 16 | 16 | |
| 32 | 15 | 15 | 15 | 15 | 16 | 16 | 16 | 16 | 17 |

Fig. 12

| Bin Index | 0 | 1 | 2 | 3 | 4 | 5 | 6 | 7 | 8 |
|---|---|---|---|---|---|---|---|---|---|
| T | | | | | Luma | | | | |
| 3 | 0 | 1 | | | | | | | |
| 4 | 0 | 1 | 2 | | | | | | |
| 6 | 3 | 3 | 4 | 4 | | | | | |
| 8 | 3 | 3 | 4 | 4 | 5 | | | | |
| 12 | 6 | 6 | 7 | 7 | 8 | 8 | | | |
| 16 | 6 | 6 | 7 | 7 | 8 | 8 | 9 | | |
| 24 | 10 | 10 | 11 | 11 | 12 | 12 | 13 | 13 | |
| 32 | 10 | 10 | 11 | 11 | 12 | 12 | 13 | 13 | 14 |
| T | | | | | Chroma | | | | |
| 3 | 15 | 16 | | | | | | | |
| 4 | 15 | 16 | 17 | | | | | | |
| 6 | 15 | 15 | 16 | 16 | | | | | |
| 8 | 15 | 15 | 16 | 16 | 17 | | | | |
| 12 | 15 | 15 | 15 | 15 | 16 | 16 | | | |
| 16 | 15 | 15 | 15 | 15 | 16 | 16 | 16 | | |
| 24 | 15 | 15 | 15 | 15 | 16 | 16 | 16 | 16 | |
| 32 | 15 | 15 | 15 | 15 | 16 | 16 | 16 | 16 | 17 |

Fig. 13

METHOD AND DEVICE FOR CONTEXT-ADAPTIVE BINARY ARITHMETIC CODING A SEQUENCE OF BINARY SYMBOLS REPRESENTING A SYNTAX ELEMENT RELATED TO PICTURE DATA

This application claims the benefit under 35 U.S.C. § 365 of International Application PCT/EP2017/071847, filed Aug. 31, 2017, which was published in accordance with PCT Article 21(2) on Apr. 12, 2018, in English, and which claims the benefit of European Patent Application No. 16306307.6, filed Oct. 5, 2016.

1. FIELD

The present principles generally relate to picture/video encoding. Particularly, the technical field of the present principles are related to context-adaptive binary arithmetic coding a sequence of binary symbols representing syntax elements required for decoding said picture data.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, picture data contains one or several arrays of samples (pixel values) in a specific video format which specifies all information relative to the pixel values of a picture and all information which may be used by a display and/or any other device to visualize and/or decode a picture for example. A still picture (or a picture of a video) comprises at least one component, in the shape of a first array of samples, usually a luma (or luminance) component, and, possibly, at least one other component, in the shape of at least one other array of samples, usually a color component. Or, equivalently, the same information may also be represented by a set of arrays of color samples, such as the traditional tri-chromatic RGB representation.

A pixel value is a picture data that may be represented by a vector of C values, where C is the number of components. Each value of a vector is represented with a number of bits which defines a maximal dynamic range of the pixel values.

Generally speaking, a picture block stands for a set of elements of picture data or syntax elements relative to picture data. For example, a picture block is a set of pixels which belong to a picture.

A video coding device may attempt to compress picture data by taking advantage of spatial and temporal redundancy. For example, a video encoder may take advantage of spatial redundancy by coding a picture block relative to neighboring (previously coded blocks). Likewise, a video encoder may take advantage of temporal redundancy by coding a picture block relative to data of previously coded pictures. In particular, the video encoder may predict a current picture block from data of a spatial neighbor or from data of a previously coded picture. The video encoder may then calculate a residual for the picture block as a difference between the actual pixel values for the picture block and the predicted pixel values for the picture block. Accordingly, the residual for a picture block may include pixel-by-pixel difference values in the pixel (or spatial) domain.

The video encoder may then apply a transform to the values of the residual to compress energy of the pixel values into a relatively small number of transformed coefficients in the frequency domain. The video encoder may then quantize the transformed coefficients, scan the quantized transformed coefficients to convert a two-dimensional matrix of quantized transformed coefficients into a one-dimensional vector including the quantized transformed coefficients. The video encoder may then apply an entropy coding process to entropy encode the scanned coefficients. Example entropy coding processes may include, for example, context-adaptive variable length coding (CAVLC), context-adaptive binary arithmetic coding (CABAC), syntax-based context-adaptive binary arithmetic coding (SBAC), probability interval partitioning entropy (PIPE) coding or other entropy encoding methodologies.

A video decoder may perform generally reciprocal techniques to the encoding techniques performed by the video encoder. Although generally reciprocal, the video decoder may, in some instances, perform techniques similar to those performed by the video encoder.

The video encoder may also entropy encode syntax elements associated with the encoded picture data for use by a video decoder in decoding the picture data. The video decoder may then rely on syntax elements or other data contained in a received bit-stream that includes the data described with respect to the video encoder.

According to some examples of syntax elements, the "last significant coefficient coordinate" is a syntax element which provides the decoder with the spatial position of the last non-zero coefficient in a picture block according to a scanning order associated with the picture block. Then, a "last significant coefficient x-coordinate" syntax element may be encoded for providing the decoder with the x-coordinate of the last significant coefficient in the picture block and a "last significant coefficient y-coordinate" syntax element may be encoded for providing the decoder with the y-coordinate of the last significant coefficient in the picture block. A "significant coefficient flag" is another syntax element which indicates whether a quantized transformed coefficient in a picture block equals zero or not.

For entropy coding the level of the quantized transformed coefficients, a video coder may entropy code the level of each quantized transformed coefficient. For example, a video coder may convert an absolute value of each non-zero quantized transformed coefficient into binary form. In this way, each non-zero transformed coefficient may be "binarized," e.g., using a unary code comprising one or more bits, or "bins". A bit for the sign of the quantized transformed coefficient may also be encoded.

In addition, a number of other syntax elements may be included to allow a video decoder to decode the picture data. For example, as described in H.264/MPEG-4 AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, February 2014) and High Efficiency Video Coding (HEVC) standards (ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265), syntax element may represent motion vector residuals, Transform Unit coding flags, Coding Group coding flags, quantized transformed coefficient magnitude (greater than 1 and greater than 2) flags, SAO data, etc.

A video coder may entropy code each binary symbol (or bin) for a block of picture data, whether corresponding to quantized transformed coefficients or syntax element (information) for the picture block, using probability estimates for each binary symbol. The probability estimates may indicate a likelihood of a binary symbol having a given binary value (e.g., "0" or "1"). The probability estimates may be included within a probability model, also referred to as a "context". Then, a video coder may determine a context (including a probability model) for a binary symbol to be coded.

Context, for a binary symbol of a sequence of binary symbols representing a syntax element, may include values of related binary symbols of previously coded neighboring syntax elements. A context may belong to a set of contexts and a context is then obtained from a context index identifying said context in said set of contexts.

As one example, the context, for a significant coefficient flag relative a quantized transformed coefficient belonging to a picture block, includes a type of said picture block (e.g., picture block size, block of lum or chroma elements), and a spatial position of said quantized transformed coefficient within the picture block according to a scanning order associated with the picture block.

As another example, the context for a binary symbol of a binarized residual transform coefficient absolute value for the picture block includes a spatial position of the binary symbol within a unary codeword that represents the absolute value, and values of previously coded coefficients of the picture block.

In other examples, the context for a binary symbol of a sequence of binary symbols representing a coded block pattern ("CBP") includes values of related binary symbols of previously coded neighboring syntax elements, e.g., on the top and to the left of the current syntax element.

The present principles are not limited to the above examples but extends to any syntax elements and contexts such as defined, for example in the H.264/MPEG-4 AVC and High Efficiency Video Coding (HEVC) standards.

In any case, a different probability model is defined for each context.

After having entropy coded a binary symbol, the probability model may be updated according to the value of the coded binary symbol to reflect the most current probability estimates.

The binary symbols associated with a picture block may be coded in one or more coding "passes." For example, during a first pass, a video coder may entropy code the significant coefficient flags and the last significant coefficient coordinates. During a second pass, the video coder may entropy code a first bin of the quantized transformed coefficient levels. The video coder may continue to perform coding passes until all of the information associated with the quantized transformed coefficients of a picture block is coded.

In some examples, the video coder may code the bins of a picture block using a combination of context adaptive and non-context adaptive coding. For example, for one or more passes, the video coder may use a bypass mode to bypass, or omit, the regular arithmetic coding process. In such instances, a fixed equal probability model may be used to code a bypass coded bin. Bypass coded bins do not include context or probability updates.

When performing context adaptive coding, in some examples, there may be relatively high serial dependencies due to multiple feedback loops.

For example, context, which indicates a particular probability model for coding a binary symbol, may be influenced by values of previously coded binary symbols, e.g., related binary symbols of previously coded syntax elements.

In addition, the probability models used to code the binary symbols may also be influenced by values of previously coded binary symbols. That is, the probability models may be maintained as a state in a finite state machine. Each particular state may correspond to a specific probability value. The next state, which corresponds to an update of the probability model, may depend on the value of the current binary symbols (e.g., the bin currently being coded).

In addition, as noted above, a particular probability model may be maintained as a state in a finite state machine, with each particular state corresponding to a specific probability value. The next state, which corresponds to an update of the probability model, may depend on the value of the current binary symbol. Such feedback loops, which may be referred to as state updates, may present a computational bottleneck. For example, it may be difficult to increase throughput due to the dependencies in the feedback loops. That is, one binary symbol may not be processed until the probability model from the previous binary symbol has been updated. In some examples, the same context may be called continuously (binary symbol by binary symbol) with high frequency.

Context-adaptive binary arithmetic coding (CABAC) is a form of entropy encoding used in the H.264/MPEG-4 and HEVC.

CABAC is a lossless compression technique, although the video coding standards in which it is used are typically for lossy compression applications.

FIG. 1 shows a generic block diagram for encoding a syntax element in CABAC.

Basically, CABAC comprises three elementary steps.

In step 100, a binarizer maps a given non-binary valued syntax element to a sequence of binary symbols (bin string). When a binary valued syntax element is given, this initial step is bypassed, as shown in FIG. 1.

For each current bin of the bin string or for each binary valued syntax element, one or more subsequent steps may follow depending on the coding mode.

In a so-called regular coding mode, a context modeling step 110 is followed by a regular coding step 120.

In context modeling step 110, a context modeler selects a context model according to the bin to be coded (usually a context index which identifies a context model among a set of several context models), and determines a context from said selected context model taking into account contextual information, such as previously encoded syntax elements or coded binary symbols, available both on the encoder and decoder side in a synchronous way, at the time the current bin is being coded. The determined context is then used to obtain a conditional probability that the current bin has a specific value, for example '0'.

Then, in regular coding step 120, the determined context (conditional probability) and the value of the current bin s (Bin value in FIG. 1) are passed to an engine which arithmetic codes the current bin taking into account said determined context. A coded value of the current bin is thus obtained and used to update the contextual information. This is the context model update feedback loop on FIG. 1. Updating the contextual information involves updating of the context for each bin as long as the bins are being coded, allowing thus progressively refining the context modeling for each bin of the bin string. Thus the CABAC encoder progressively learns the statistical behavior of each regular-encoded bin.

The regular-encoded bits, output of the regular coding step 120, are added to an output bit-stream.

Alternatively, a so-called bypass coding mode is chosen for coding a bin in order to allow a speedup of the whole encoding (and decoding) process by means of a simplified coding engine without the usage of an explicitly assigned probability model, as illustrated by the lower right branch of the switch in FIG. 1. The bypass mode consists in simply writing a bit in the output bit-stream and assigning the so-obtained bit value to the current bin. This coding mode has the advantage of being straightforward, hence fast. It is typically efficient thus used for bins that have a uniform statistical distribution, i.e. equal probability of being equal to '1' or '0'.

FIG. 2 illustrates an example of the CABAC coding when a sequence of binary symbols representing significance coefficient flags relative to a picture block.

This is a non-restricting example because the present principles apply to any sequence of binary symbols representing syntax element.

In the example of FIG. 2, is represented a picture block (here of binary symbols), representing a block of the significance coefficient flags (a flag may be associated to each quantized transformed coefficient of the picture block). This flag equals 0 if the quantized transformed coefficient equals 0 and 1 if not). This picture block is scanned according to a specific scanning order. For example, the scanning order, illustrated by the dotted lines, starts from the bottom-right corner to the top-left corner of the picture block. Assuming a binary symbol s to be coded, several candidate contexts $C_i$ are defined previously for the binary symbol s according to said scanning order and each context $C_i$ is associated with a context index $CantVal_i$ that identified the context $C_i$ in a set of candidate contexts.

For example, four candidate contexts $C_i$ (i=1, . . . 4) are defined for the binary symbol s from two previously coded syntax elements x1 and x2 (significance coefficient flags). Each context $C_i$ is defined according to the binary values of x1 and x2 and a specific context index $CantVal_i$ is assigned to each of the context.

As example, illustrated in FIG. 3, a context index comprises a bit valMPS representing a specific binary value, so-called Most Probable Symbols (MPS), of the binary symbol s and bits (e.g. 7 bits) pStateIdx representing a probability p' (or state) from which a probability p is deduced.

According to an example, in the context modeling step 110, according to the values of x1 and x2, a context Cs is selected from the four candidate contexts and the associated context index ContVals is assigned to the binary symbol s.

In the regular coding stage 120, the update of the context model of selected context with index ContVals is made following the process illustrated in FIG. 4 depending on whether or not the binary symbol s equals MPS.

The evolution is made through two tables transIdxMPS (if the binary symbol s is the MPS) and transIdxLPS (if the binary symbol s is not the MPS, i.e. it is the Least Probable Symbol (LPS)). These tables are provided in FIG. 5 for an entry pStateIdx.

Following this example, the probability $p_{MPS}$ of the binary symbol s to be the MPS is quantized linearly on 8 bits, from 0 to 127. It is deduced from the selected context index by $$p_{MPS}=(p'+64)/127=(pStateIdx+64)/127$$

and the probability p of the symbol s to be 1 is deduced obviously from $p_{MPS}$ depending on the value of the MPS.

| | |
|---|---|
| p = $p_{MPS}$ | if MPS = 1, |
| p = 1 − $p_{MPS}$ | if MPS = 0. |

Context-Adaptive coding is a powerful tool that allows to follow dynamically the statistics of the different syntax elements relative to encoded picture data.

Thus, using CABAC for entropy coding picture data and/or syntax elements relative to picture data has led to the extensive use of many contexts in HEVC/H265 (up to several hundreds) in order to model their statistics.

Selecting a context index depends on many things, thus it is usual to use a huge number of contexts in order to capture the statistics of the syntax elements and thus optimizing the performance of CABAC. However, because the contexts shall be stored in memory for encoding all the binary symbols of one or more sequences of binary symbols, increasing the number of contexts increases the requirement in term of memory and processing complexity. That is why limiting the number of contexts is crucial to ensure efficient hardware implementability of a video decoder implementing CABAC for encoding syntax elements.

One of the challenge is thus to benefit from the increased compression capability provided by CABAC without increasing too much the number of contexts.

FIG. 6 shows a generic block diagram depicting the CABAC decoding of a syntax element given an input bit-stream comprising bits coded according to the method of FIG. 1. The input bit-stream may conform to the HEVC specification.

At any point of the decoding, one assumes that the decoder knows which syntax element is to be decoded next. This is fully specified in the standardized bit-stream syntax and decoding process. Moreover it also assumes how the current syntax element to be decoded is binarized (i.e. represented as a bin string, each bin equals to '1' or '0'), and what is the coding mode used for encoding each bin (regular coding or bypass mode).

These information are fully specified in the considered video compression standard, H.264 or HEVC.

Therefore, in step 600, a parser obtains a series of bits by decoding (parsing) coded bits from an input bit-stream.

For each current coded bin to be decoded, one or more subsequent steps may follow depending on the coding mode used for coding said current coded bin.

When the bypass coding mode was used to code the current coded bin, in a bypass decoding step 610, the value of the current coded bin is the decoded value of the current coded bin.

When the regular coding mode was used to code the current coded bin, the context modeling step 110 is followed by the regular decoding step 620.

The context modeling steps of FIGS. 1 and 6 are strictly the same and the regular decoding step 620 of FIG. 6 is quite similar to the regular coding step 110 of FIG. 1.

In the regular decoding step 620, the decoded value of the current coded bin is obtained from a context given by the context modeling step 110: said context (conditional probability) and the value of the current bits are passed to an engine which arithmetic decodes the current bin taking into account said context. A decoded value of the current bin is thus obtained and used to update the contextual information.

This is the context model update feedback loop on FIG. 6. Updating the contextual information involves updating of the context for each bin as long as the bins are being decoded, allowing thus progressively refining the context modeling for each bin. Thus the CABAC decoder progressively obtains a decoded value of the current coded bin equal to the original value of the current bin (lossless compression).

When the decoded value of the current bin (output of either the bypass decoding step 610 or the regular decoding step 620) is obtained, the decoded value of the current bin is relative to either a binary valued syntax element or a non-binary valued syntax element. This may be specified by the considered video compression standard, H.264 or HEVC. Next, if the decoded value of the current bin is relative to a binary valued syntax element, the CABAC decoding ends, and when the decoded value of a current bin is relative to a non-binary valued syntax element the decoder knowns how to build the syntax element from the decoded values of bins (an output bin string of steps 620 or 610).

In step 630, a converter then converts said output bin string into a non-binary valued syntax element by applying a process reciprocal of the binarization (step 100).

In video compression, it is well-known that encoding a whole picture as a single picture block is not optimal and dividing recursively the whole picture into sub-blocks before encoding each leaf of a coding tree increases the coding efficiency.

For example, in the HEVC standard, a picture to be encoded is divided into Coding Tree Units (CTU) having typically a square shape (64×64, 128×128, or 256×256 pixels). Each CTU is represented by a coding tree in the compressed domain. A coding tree describes the recursive splitting of a CTU. Each leaf of the coding tree (a coding unit) has a square shape if a quad-tree dividing is used but some of the leaves may also have rectangular shape when a Quad-tree Plus Binary Tree (QTBT) decomposition is used. More precisely, the QTBT decomposition of a CTU is made of two stages: first the CTU is split in a quad-tree fashion, then each quad-tree leaf can be further divided in a binary fashion. This is illustrated on the right of FIG. 7 where solid lines represent the quad-tree decomposition phase and dashed lines represent the binary decomposition that is spatially embedded in the quad-tree leaves. The splitting of a coding unit is decided on the encoder side through a rate distortion optimization procedure, which consists in determining the QTBT representation of the CTU with minimal rate distortion cost.

In HEVC standard, the size, i.e. the width and the height, of coding unit is always a power of 2, and typically goes from 4 to 128.

The inventors found that allowing an asymmetric splitting mode in the QTBT decomposition increases the coding efficiency because the coding tree better matches the spatial structure in a picture providing coding units with more homogenous content.

An asymmetric splitting mode consists in splitting a coding unit with a size (width and/or height) equals to a multiple of an integer value m, into two sub-coding units with a size (width and/or height) equals to $m \cdot 2^n$ where n is an integer value and m is an integer value chosen in order that $m \cdot 2^n$ is not equal to a power of 2.

FIG. 8 shows examples of four asymmetric splitting modes when m equals 3. Those examples are given only for illustrative purpose and may be extended to other values of m such as 5, 7, . . . etc. Introducing asymmetric splitting modes in the encoding of a coding unit with size (width w and/or height h) equals to a multiple of m, allows splitting said coding unit through one of said asymmetric splitting modes. For example, splitting a coding unit with a width w and a height h equals to a multiple of 3 according to the asymmetric splitting mode HOR_UP (horizontal-up) in FIG. 8, would lead to 2 sub-coding units with respective rectangular sizes $$\left(w, \frac{h}{4}\right) \text{ and } \left(w, \frac{3h}{4}\right).$$

When an asymmetric splitting mode is used, some coding unit has either its width and/or its height equal to $m \cdot 2^n$. Then, the usual HEVC tools initially designed for encoding coding units with size equals to a power of 2 have to be adapted to these new size of coding units which are not equal to a power of 2.

One of the problems solved by the present principles is how to efficiently entropy encode/decode the quantized transformed coefficients contained in asymmetric coding units, in a way that provides good compression efficiency (rate distortion performance) together with a minimum complexity increase of the coding design. In other words, one of the challenges is to benefit from the increased compression capability provided by the use of asymmetric splitting modes without increasing the number of contexts used by the HEVC entropy encoding (CABAC).

3. SUMMARY

The following presents a simplified summary of the present principles in order to provide a basic understanding of some aspects of the present principles. This summary is not an extensive overview of the present principles. It is not intended to identify key or critical elements of the present principles.

The following summary merely presents some aspects of the present principles in a simplified form as a prelude to the more detailed description provided below.

The present principles set out to remedy at least one of the drawbacks of the prior art with a method for context-adaptive binary arithmetic coding/decoding a sequence of binary symbols representing a syntax element related to picture data belonging to a picture block. Said method comprises, for each binary symbol of the sequence of binary symbols:
  determining a context according to the size of the picture
    block and the binary symbol to be coded; and
  arithmetic-coding/decoding said binary symbol taking
    into account said determined context;
characterized in that said determining of a context comprises:
  when the size of said picture block is a power of 2,
    determining a context according to the size of said
    picture block; and
  when the size of said picture block is not a power of 2,
    determining a context according to a block size immediately higher or lower than the size of said picture
    block, said block size being equal to a power of 2.

According to other of their aspects, the present principles relate to a device and a computer program product comprising program code instructions to execute the steps of the above method when this program is executed on a computer and a non-transitory storage medium carrying instructions of program code for executing steps of the above method when said program is executed on a computing device.

The specific nature of the present principles as well as other objects, advantages, features and uses of the present principles will become evident from the following description of examples taken in conjunction with the accompanying drawings.

4. BRIEF DESCRIPTION OF DRAWINGS

In the drawings, examples of the present principles are illustrated. It shows:

FIGS. 12 and 13 show examples of a table which gives sets of contexts indices according to different the TB sizes;

Similar or same elements are referenced with the same reference numbers.

5. DESCRIPTION OF EXAMPLE OF THE PRESENT PRINCIPLES

Figure 1:
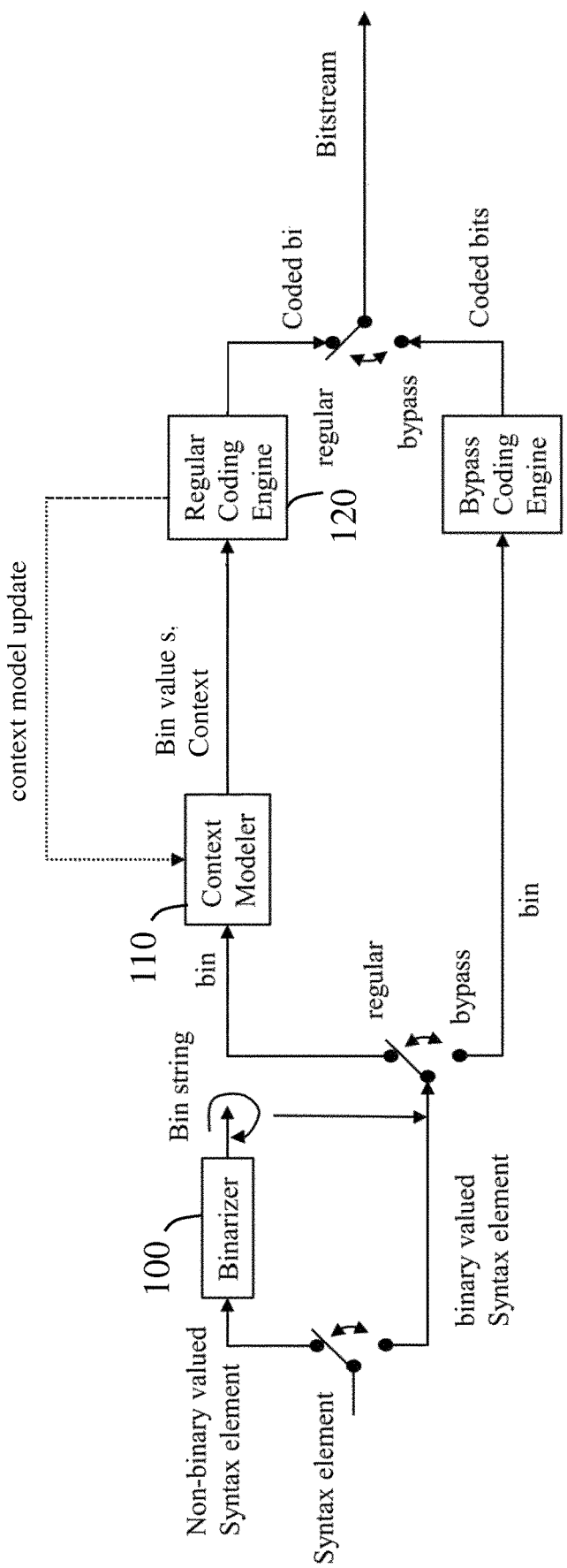
FIG. 1 shows a generic block diagram for encoding a syntax element using CABAC.
Figure 2:
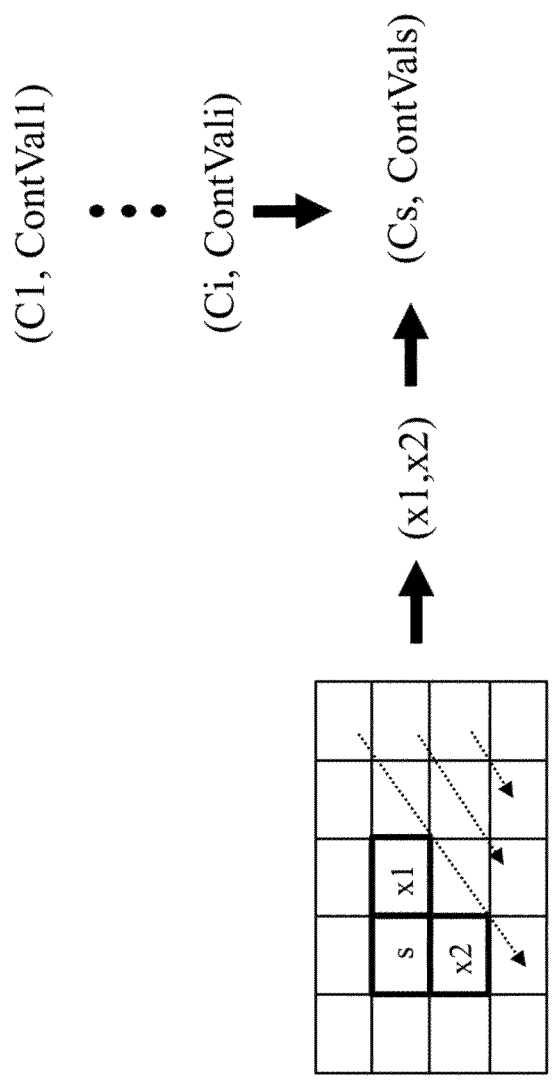
FIG. 2 illustrates an example of the context selecting stage when a sequence of binary symbols representing a significance map relative to a block of video data.
Figures 3, 4, 5:
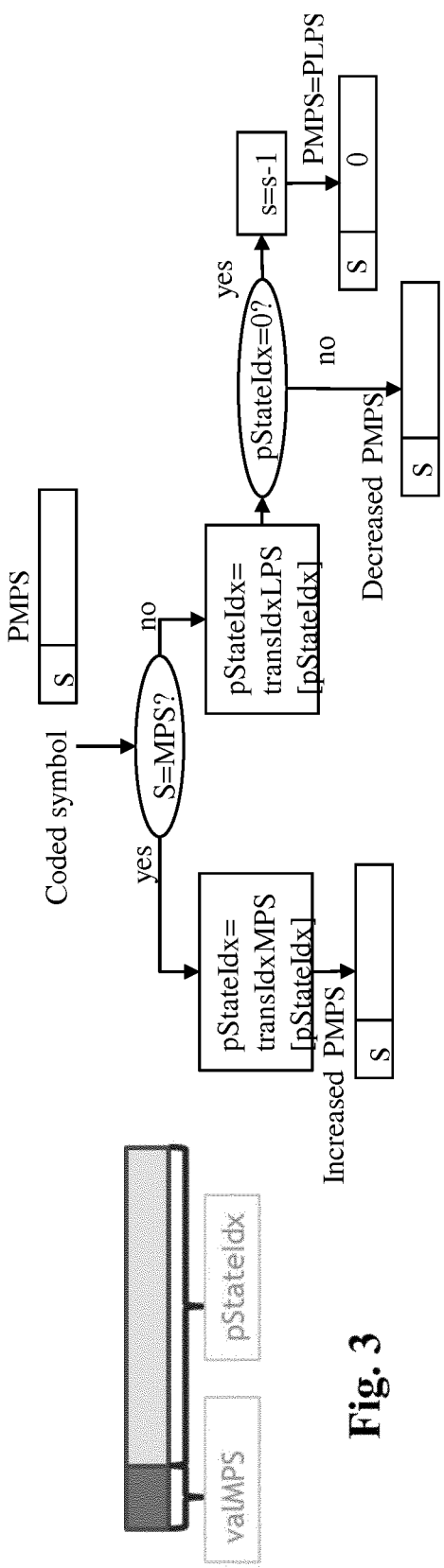
FIG. 3 shows an example of a context index.
FIG. 4 shows a generic block diagram for updating a context index.
FIG. 5 shows well-known tables usually used for context index updating.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

The present principles disclose a modified version of CABAC in which the strategy for selecting a context among the set of contexts depends on the size of the picture block to be encoded.

Figure 9:
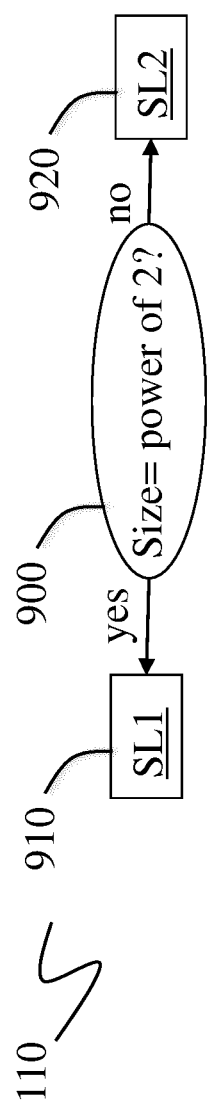
FIG. 9 shows a block diagram illustrating the selecting of a context among a set of several contexts for a binary symbol according to the size of a picture block (step 110) in accordance with an example of the present principles.

FIG. 9 shows a block diagram illustrating the selecting of a context among a set of several contexts for a binary symbol according to the size of a picture block (step 110) in accordance with an example of the present principles.

In step 900, a module checks if the size (width and height) of the picture block is a power of 2 or not.

If yes, in step 910, a selector SL1 determines a context according to the size of said picture block when the size of said picture block is a power of 2.

If not, in step 920, a selector SL2 determines a context according to a block size immediately higher or, alternatively, lower, than the size of said picture block, said block size is a power of 2.

These present principles may be applied to encode any kind of picture element or syntax elements relative to picture data having a non-uniform statistical behavior.

In the following, the embodiments of these present principles are described in relation with the HEVC standard (ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265) but may extend to any other video encoding/decoding scheme requiring an entropy coding for encoding picture data or syntax elements.

In the HEVC standard, and the join Exploration model associated with ("Algorithm Description of Joint Exploration Test Model 3", Document JVET-C1001_v3, Joint Video Exploration Team of ISO/IEC JTC1/SC29/WG11, $3^{rd}$ meeting, 26 May-1 Jun. 2015, Geneva, CH), quantized transformed coefficients, which belong to a picture block called a Transform Block (TB), are usually entropy coded using CABAC. A TB is a picture block which may be a coding unit (leaf) of a coding tree obtained, for example, as described above.

First, the transform block TB is split into sub-blocks of quantized transformed coefficients called Coding Groups (CG). The entropy coding/decoding is made of several scanning passes, which scan the TB according to a scan pattern selected among several possible scan patterns.

Figures 10, 11:
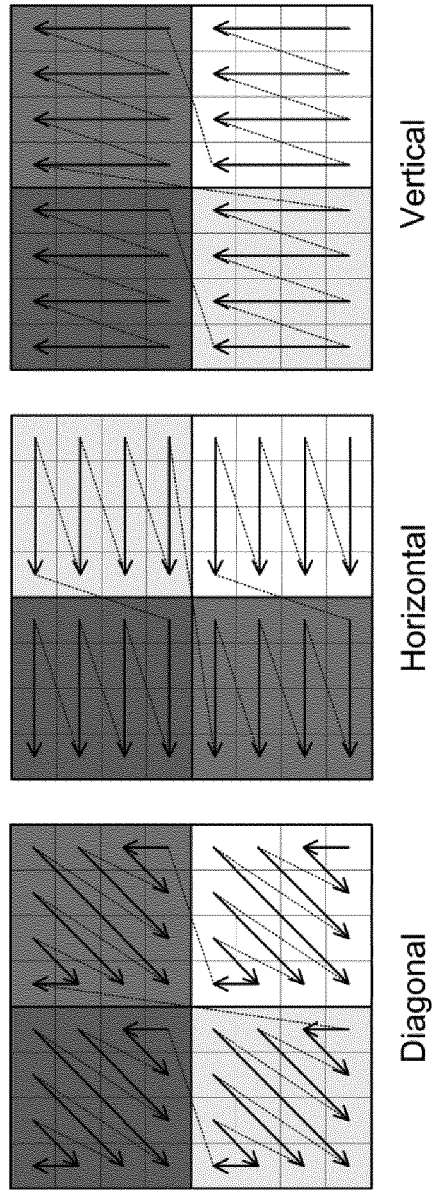
FIG. 10 shows examples of scanning orders in a 8×8 TB.
FIG. 11 shows a table used for binarization of a "last significant coefficient coordinate" syntax element.

As an example, illustrated on FIG. 10, a 8×8 TB is split into four 4×4 coding groups (CGs). For inter-predicted Coding Units, the diagonal scanning pattern is always used, while for 4×4 and 8×8 intra-predicted Coding Units, the selected scanning pattern depends on the Intra-prediction mode active for that CU.

A scan pass over a TB then consists is processing each CG sequentially according to one of the three scanning orders (diagonal, horizontal, vertical), and the 16 quantized transformed coefficients inside each CG are scanned according to the considered scanning order as well. A scanning pass starts at the last significant (non-zero) coefficient in the TB, and processes all quantized transformed coefficients until the quantized transformed coefficient located at the top-left corner of the CG (usually carrying most of the energy of the CG).

Two syntax elements called "last significant coefficient x-coordinate" and "last significant coefficient y-coordinate" are thus added to the output bit-stream of a HEVC-compliant encoder for each TB, to provide a decoder with the spatial position (x- and y-coordinate) of the last non-zero quantized transformed coefficient in a TB according to a scanning order associated with said TB.

The entropy coding of quantized transformed coefficients may comprise up to five scan passes, respectively dedicated to the coding of each of the following syntax elements:
significant-coeff-flag: this is a binary flag that indicates if a quantized transformed coefficient equals zero or not;
coeff-abs-level-greater1-flag: this is a binary flag that indicates if the absolute value of a quantized transformed coefficient level is greater than 1 or not;
coeff-abs-level-greater2-flag: this is a binary quantized transformed coefficient that indicates if the absolute value of a coefficient level is greater than 2 or not;
coeff-sign-flag: this is a binary flag that indicates the sign of a significant (non-zero) quantized transformed coefficient;
coeff-abs-level-remaining: This syntax element represents the remaining value for absolute value of a quantized transformed coefficient level (if the quantized transformed coefficient value is larger than that coded in previous passes).

Once a coefficient's absolute value is known by decoding a subset of the four first pass above, then further syntax elements is not coded in the remaining passes for that coefficient, with regards to its absolute value. Same for the sign coding: the coeff-sign-flag is sent only for non-zero coefficients.

All scan passes are coded for a given CG until all the quantized transformed coefficients in that CG can be reconstructed, before going to next CG.

The overall decoding of a TB from a bit-stream comprises a parsing of said bit-stream providing the decoder with the following syntax elements:
1. the "last significant coordinates" syntax elements.
2. for each successive CG from the CG containing the last significant coefficient in the TB to the top-left CG in the TB:
   a. the CG significance flag, which is called coded_sub_block_flag in the HEVC standard;
   b. the significant coefficient flag for each quantized transformed coefficient in the considered CG. This corresponds to the syntax element sig_coeff_flag in the HEVC standard.
   c. for non-zero quantized transformed coefficient in the considered CG:
      i. coeff_abs_level_greater1_flag: this flag indicates if current coefficient's absolute value is higher than 1 or not. If not, the absolute value if equal to 1;
      ii. coeff_abs_level_greater2 flag: this flag indicates if current coefficient's absolute value is higher than 1 or not. If not, the absolute value if equal to 1;
      iii. coeff_sign_flag: this indicates the sign of the non-zero coefficients;
      iv. coeff_bas_level_remaining: this encodes the absolute value of the coefficient higher than 2 in absolute value.

The following embodiments of the present principles focus only on the coding/decoding of the "last significant coefficient coordinates" syntax elements, and the coding/decoding of the "significant coefficient flag" syntax element because the contexts used to code/decode them depend on the size of the TB, in the join Exploration model associated with ("Algorithm Description of Joint Exploration Test Model 3", Document JVET-C1001_v3, Joint Video Exploration Team of ISO/IEC JTC1/SC29/WG11, $3^{rd}$ meeting, 26 May-1 Jun. 2015, Geneva, CH).

According to a first embodiment of the present principles, the method of FIG. 9 is applied for context-based arithmetic coding/decoding the "last significant coefficient coordinates" syntax elements relative to a coding group CG.

The "last significant coefficient x-coordinate" syntax element is relative to a CG belonging to a TB and is lossless represented by:

an interval index (prefix) identifying an interval of integer values in which the x-coordinate to code is contained, among a set of (N+1) intervals, where $N=2\times\log_2(T)-1$, where T is the size of the transform, that is to say the width or height in the case of a square block, used to obtain the transformed coefficients in the CG; and an offset (suffix) that determines the x-coordinate of the last significant coefficient within the interval signaled by said interval index.

The method obtains said interval index in order that the x-coordinate value belongs to the interval of values identified by said interval index, and obtains said offset within the identified interval in order that the "last significant coefficient x-coordinate" value is lossless represented by said prefix and suffix.

A suffix is a binary valued syntax element which is usually coded in bypass mode, for example by using fixed-length code over b bits, $b=\max(0, \lfloor prefix/2 \rfloor -1)$ as illustrated by FIG. 11. The coded suffix is added to the output bit-stream.

A prefix representing an interval index is a non-binary valued syntax element which is context-based arithmetic-coded according to an example of the present principles (steps 110, 120). The prefix is then added to the out-bit-stream.

For encoding a "last significant coefficient x-coordinate" (the last significant coefficient y-coordinate") syntax element, first, in step 100 (FIG. 1), the binarizer maps the interval index to a truncated unary code, as illustrated by FIG. 11, when T=32. The maximum length of the truncated unary code (which is also the number of context-based coded bins) for one coordinate is 3, 5, 7, and 9 for T=4, 8, 16, and 32, respectively. Indeed, for example, if the T equals 4, then the last significant coefficient x-coordinate can be equal to 0, 1, 2 or 3. These values are respectively identified by the truncated unary codes '0', '10', '110' and '1110'. Thus up to 3 bins are required for T equals 4. Moreover, for T equals 8, then the maximum truncated codeword is '111110'. Since the last significant coefficient x-coordinate is at most 7, then the decoder is able to infer the prefix code is '111110', once it has decoded 5 successive bins equal to '1'. This is why at most 5 bins are required for the prefix in case transform size is 8.

Next, in step 900 (FIG. 9), one checks whether TB size is a power of 2. At least one set of contexts is obtained according to different TB sizes equal to powers of 2, each set of contexts being obtained for a TB size equals to a particular power of 2.

If yes, in step 910, the selector SL1 selects a set of contexts among said at least one obtained set of contexts, for each bin of the truncated unary code, according to the TB size.

If no, in step 920, the selects SL2 SL1 selects a set of contexts among said at least one obtained set of contexts, for each bin of the truncated unary code, according to a block size immediately higher or, alternatively, lower, than the TB size, and said block size being equal to a power of 2.

Finally, each bin of the truncated unary code representing the "last significant coefficient x-coordinate" syntax element is arithmetic coded (step 120) taking into account a context determined among said selected set of contexts according to the index of the bin in the truncated unary code.

FIG. 12 shows an example of a table which gives sets of contexts indices according to the different TB sizes. Note, "bin index" of the table on FIG. 12 identifies the index of the bin to be coded in the truncated unary code.

According to this example, when the TB size is a power of 2, i.e. T=2, 4, 8, 16 or 32, a set of contexts is obtained according to T. For example, when T=8, the set of context indices (3,3,3,4,4,5) is selected. The final determined context index depends on the index of the current bin in the truncated unary code. For example, if the bin of rank 2 in the truncated unary code is the current bin, the context index 4 is considered.

When the TB size is not a power of 2, i.e. T=3, 6, 12 or 24, a set of contexts is selected according to a block size immediately lower than the TB size.

For example, when the TB size equals 12, the set of context indices relative to the TB size equals to 8 is selected. The determined context index depends on the index of the current bin of the truncated unary code. For example, if the bin of rank 2 of the truncated unary code is the current bin, the context index 4 is considered.

FIG. 13 shows an example of a table which gives sets of contexts indices according to different the TB sizes. Note, "bin index" of the table on FIG. 13 identifies the index of the bin to be coded in the truncated unary code.

According to this example, when the TB size is a power of 2, i.e. T=2, 4, 8, 16 or 32, a set of contexts is selected according to the TB size. For example, when T=8, the set of context indices (3,3,3,4,4,5) is selected. The determined context index depends on the index of the current bin in the truncated unary code. For example, if the bin of rank 2 of the truncated unary code is the current bin, the context index 4 is considered.

When the TB size is not a power of 2, i.e. T=3, 6, 12 or 24, a set of contexts is selected according to a block size immediately higher than the TB size.

For example, when the TB size equals 12, the set of context indices relative to the TB size equals to 16 is selected. The determined context index depends on the index of the current bin of the truncated unary code. For example, if the bin of rank 2 of the truncated unary code is the current bin, the context index 7 is considered.

For coding a prefix relative to a "last significant coefficient x-coordinate", the present principles re-use the contexts associated to the TB size that are power of two, immediately higher or lower than a current TB size equals to $m \cdot 2^n$ (different of a power of 2).

Mathematically speaking, for a TB size (width or height) equal to $3 \cdot 2^n$ (m=3), the set of contexts relative to the TB size $2^{n+1}$ (FIG. 12) or $2^{n+2}$ (FIG. 13) is used.

Thus, the present principles reuse contexts already used for picture block with a size equals to a power of 2 (as defined in HEVC standard or in the join Exploration model associated with HEVC standard) rather than defining new contexts for picture blocks with a size not equal to a power of 2. This avoids an increase of the number of contexts to store and handle and thus avoids a significant increase of the complexity of the encoding/decoding of Transform Block (TB) with a size not equals to a power of 2.

According to an embodiment, a context for a bin of the truncated unary code encoding a prefix relative to a "last significant coefficient x-coordinate" syntax element, may be determined (steps 910 or 920) according to the TB size as follows. Said context is identified by a context index currCtxIdx among a set of contexts itself identified among at least one previously determined set of contexts.

First, a base context index baseCtxIdx is computed for the "last significant coefficient x-coordinate" to code the prefix from the width of the TB.

This base context index identifies a set of context among said at least one previously determined set of contexts.

The base index may be systematically set to zero for the chroma components of a picture, and, for the Luma component, may be calculated as a function g_uiLastPrefixCtx of the width w of the TB:

$$baseCtxIdx = \\ Chroma?\ 0:\ g\_uiLastPrefixCtx\left[\log2\left(w\ \%\ m == 0?\ w*\frac{4}{m}:\ w\right)\right]$$

Next, a context shift value ctxIdx_shiftX may be calculated as follows:

$$CtxIdx_{shiftX} = \\ is\ chroma?\ Clip3(0, 2, (\gg 3)):\ \left(\left(\log2\left(\frac{w}{m} == 0?\ w*\frac{4}{m}:\ w\right)+1\right) \gg 2\right)$$

Alternatively, $$baseCtxIdx = \\ Chroma?\ 0:\ g\_uiLastPrefixCtx\left[\log2\left(w\ \%\ m == 0?\ w*\frac{2}{m}:\ w\right)\right]$$

$$CtxIdx_{shiftX} = is\ chroma?\ Clip3(0, 2, (\gg 3)):$$

$$\left(\left(\log2\left(\frac{w}{m} == 0?\ w*\frac{2}{m}:\ w\right)+1\right) \gg 2\right)$$

Next, the content index currCtxIdx is determined for a bin of the prefix, as a function of the base context index baseCtxIdx and a context shift value ctxIdx_shiftX is determined according to the index prefixBinIdx of the current bin to be coded in the truncated unary code:

currCtxIdx=baseCtxIdx+
(prefixBinIdx>>ctxIdx_shiftX)     (1)

Note that the context index for the first bin of the prefix may equal to the base context index baseCtxIdx.

Figure 6:
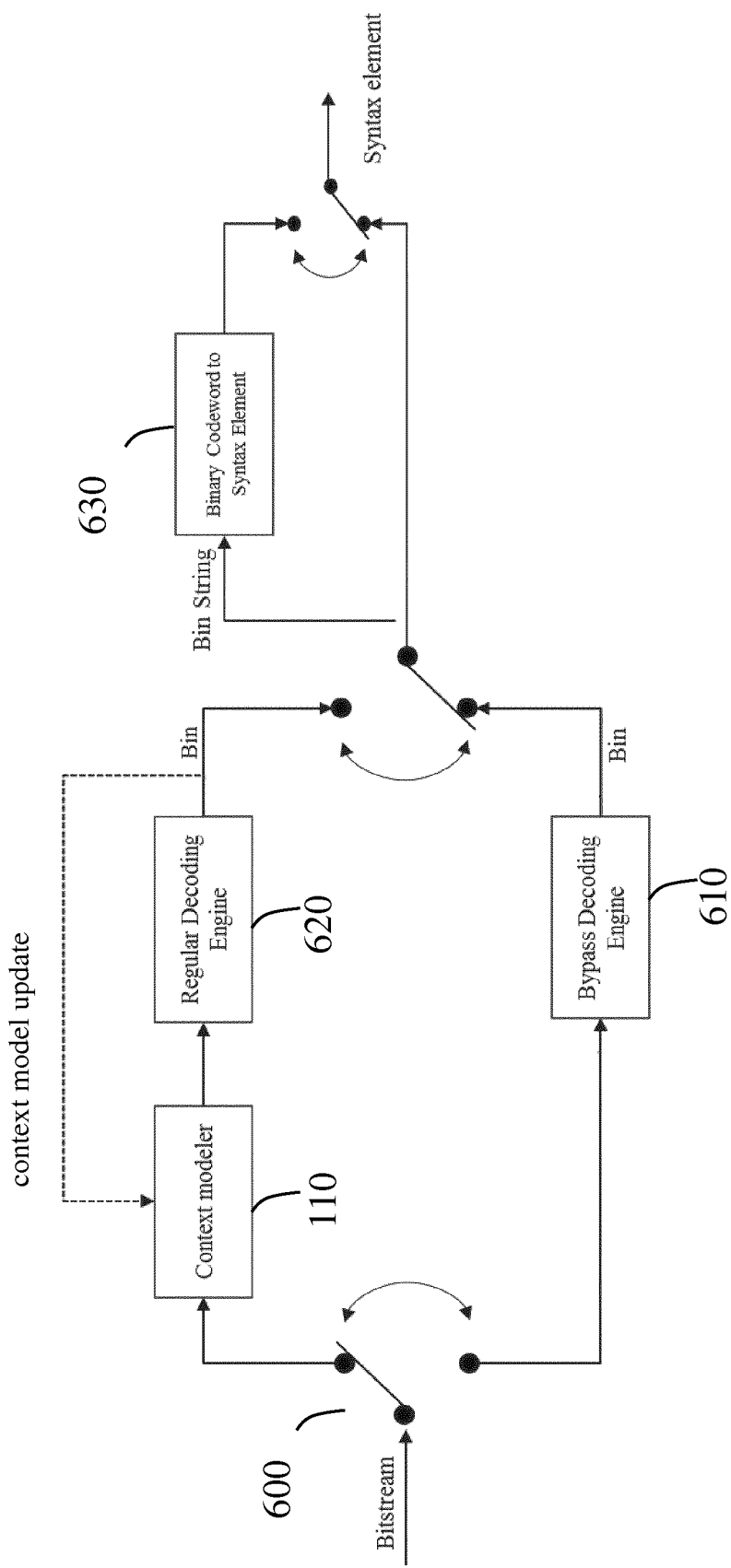
FIG. 6 illustrates a method for context-adaptive binary arithmetic decoding a binary symbol s of a sequence of binary symbols in accordance with an example of the present principles.
Figure 7:
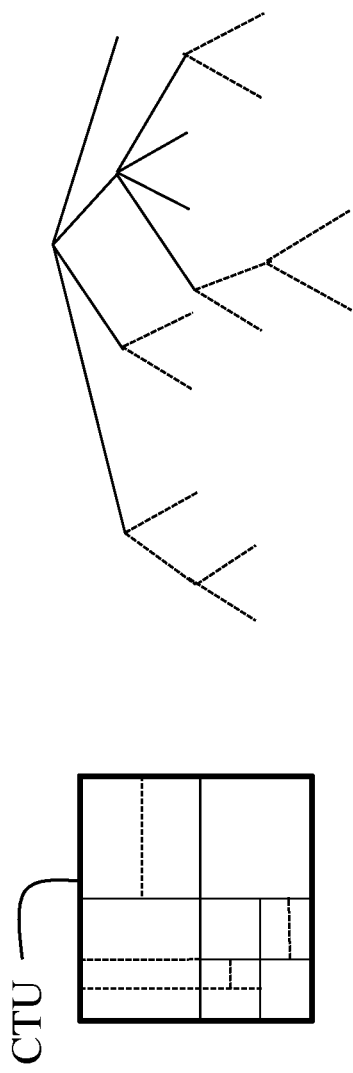
FIG. 7 illustrates an example of an embodiment of the method of FIG. 6 when the binary symbol s represents, for example, a significance flag of a significance map relative to a block of video data.
Figure 8:
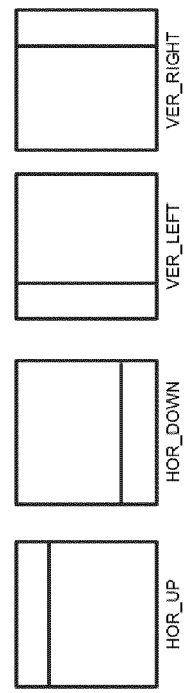
FIG. 8 shows examples of four asymmetric splitting modes when m equals 3.

According to an embodiment of FIG. 6, a "last significant coefficient x-coordinate" (the last significant coefficient y-coordinate") syntax element is decoded from an input bit-stream as follows.

The context index currCtxIdx is computed by equation (1) as follows. Once the base context index baseCtxIdx is obtained at step 110, the decoder generates a series of decoded bins from the input bit-stream. For each bin of the series of bins to decode, a context index currCtxIdx is computed as the sum of the base context index and a context increment value (prefixBinIdx>>ctxIdx$_{shiftX}$) obtained strictly the same way as on the encoder side (equation 1). The so-obtained context index currCtdxIdx corresponds to the index of the context model provided by the context modeling step 110. Then the current bin value (1 or 0) of the series of bins to decode is arithmetically decoded by means of the context with determined identifier (step 620 of FIG. 6).

Then once a '0' bin value of the series of bins to decode is decoded or the maximum number of '1' bins is reached for the considered TB size, this means the series of decoded bins corresponds to a truncated unary binarized prefix of FIG. 11. Then the decoder knows the number b of suffix bins to by-pass decode, which provides the suffix that determines the x-coordinate of the last significant coefficient within the interval signaled by said decoded prefix.

Finally, the last significant coefficient x-coordinate, noted last in following equation, is reconstructed based on the decoded prefix and suffix values as follows:

last=$2^b$(2+(prefix %2))+suffix, if prefix>3 last=prefix
otherwise

A context index for the "last significant coefficient y-coordinate" syntax element may be selected among a set of contexts according to the TB size in a similar manner.

According to a second embodiment of the present principles, the method of FIG. 9 is applied for context-based arithmetic coding/decoding the "significant coefficient flag" syntax element relative to a coding group CG belonging to a TB.

The "significant coefficient flag" is a binary valued syntax element relative to a quantized transformed coefficient of the CG.

First, a base context offset ctxOffset is calculated at step 110 as follows:

ctxOffset=isChroma?0:indexOnTBSize     (2)

where indexOnTbSize is an interval index computed as follows:

indexOnTbSize=ui Log 2BlockSize≤2?0:f(ui Log
2BlockSize)     (3)

where ui Log 2BlockSize is a value computed according to the size (area) of TB.

Second, each quantized transformed coefficient in the CG is considered from the last coefficient towards the lowest frequency coefficient. For each quantized transformed coefficient, a context index currCtxIdx for the coding of its significance is computed by adding a context increment ctxIncrement to the base context offset ctxOffset that determines the x-coordinate of the last significant coefficient within an interval of integer values signaled by said interval index indexOnTbSize.

Finally, the "significant coefficient flag" is arithmetic coded (step 120) taking into account the context associated with the context index currCtxIdx=ctxOffset+ctxIncrement.     (4)

According to an embodiment, the context increment ctxIncrement is computed as follows, illustrated on FIG. 14.

The context increment ctxIncrement depends on the values of the "significant coefficient flag" values of previously coded quantized transformed coefficients in the neighborhood covered by a local template. More specifically, the context increment ctxIncrement is computed based on the sum of the significant flags of neighboring coefficients. FIG. 14 illustrates an example of such a template. According to this example, the context increment associated to current quantized transformed coefficient (represented by a white circle) is calculated as follows:

ctxIncrement=sigCoeffFlag(x+1,y)+sigCoeffFlag(x+2,
y)+sigCoeffFlag(x,y+1)+sigCoeffFlag(x,y+2)+
sigCoeffFlag(x+1,y+1)     (5)

Where x and y are the coordinates of current coefficient in considered TB, and sigCoeffFlag(x,y) is equal to 1 if quantized transformed coefficient at position (x,y) is non-zero, and is equal to 0 otherwise. Note x0, respectively x3, x1, x4 and x2, is the neighboring coefficients with coordinates (x+1,y), (x+2,y), (x,y+1), (x,y+2) and (x+1, y+1) respectively.

Figure 14:
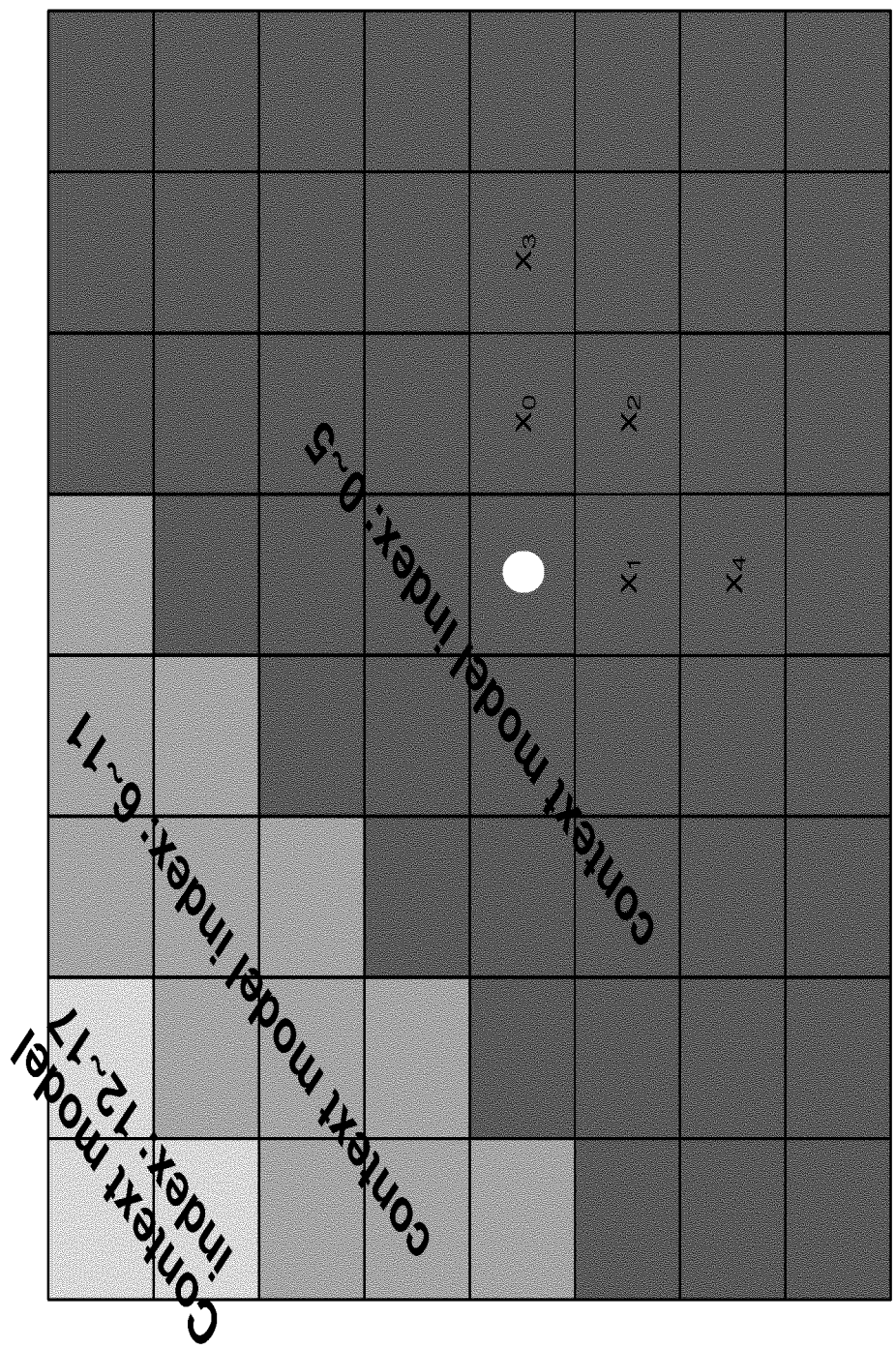
FIG. 14 shows an example of computing a context increment ctxIncrement in accordance with an embodiment of the present principles.

To capture the characteristics of quantized transformed coefficients at different frequencies, the TB may be split into up to three regions and the splitting method is fixed regardless of the TB size, as illustrated on FIG. 14. The context indices are assigned to each region.

According to the second embodiment of the present principles, in step 900 (FIG. 9), one checks whether the width w and/or the height h of the TB is a power of 2.

If yes, in step 910, the selector SL1 determines a context according to a base context index indexOnTbSize itself determined according to the TB size.

If no, in step 920, the selector SL2 determines a context according to a base context index indexOnTbSize itself determined according to a block size immediately higher or, alternatively, lower, than the TB size, said block size being equal to a power of 2.

According to an embodiment, the base context index indexOnTbSize is given by:

$$ui\text{Log2BlkSize} = \left(\log 2\left(w \% m == 0? \; w*\frac{2^{\lfloor \log_2(m) \rfloor}}{m} : w\right) + \log 2\left(h \% m == 0? \; h*\frac{2^{\lfloor \log_2(m) \rfloor}}{m} : h\right)\right) >> 1$$

where w and h are the width and the height of the TB respectively and f(.) a mathematical function.

According to a variant, $$ui\text{Log2BlkSize} = \left(\log 2\left(w \% m == 0? \; w*\frac{2^{\lfloor \log_2(m) \rfloor+1}}{m} : w\right) + \log 2\left(h \% m == 0? \; h*\frac{2^{\lfloor \log_2(m) \rfloor+1}}{m} : h\right)\right) >> 1$$

The base content index indexOnTbSize identifies a particular set of contexts relative to a particular TB area. This means separated sets of contexts may be employed to code the "significant coefficient flag" of TB with different areas.

The context offset ctxOffset may equal said base context index for luma component and equals 0 to chroma components.

According to an embodiment of FIG. 6, a "last significant flag" syntax element is decoded from an input-stream as follows.

First, a context index associated to at least 'significant coefficient flag' is obtained from the context modeling step 110), identical to the context modeling step of the encoder.

Thus, the context index is calculated as the sum of a base context offset ctxOffset and a context increment ctxIndex-Increment, each calculated exactly the same way as on the encoder side, according to equations (4) and (5).

Next, given the context model with said calculated context index and the bits of the input bit-stream, the arithmetic decoding step 620 is able to decode the bin value that represents the 'significant coefficient flag' associated to current coefficient of CG currently being decoded.

On FIG. 1-14, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 15:
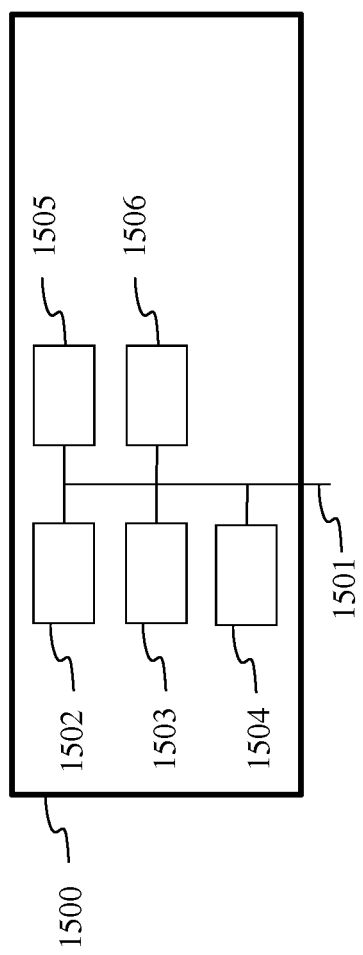
FIG. 15 shows an example of an architecture of a device in accordance with an example of present principles.

FIG. 15 represents an exemplary architecture of a device 1500 which may be configured to implement a method described in relation with FIG. 1-14.

Device 1500 comprises following elements that are linked together by a data and address bus 1501:
- a microprocessor 1502 (or CPU), which is, for example, a DSP (or Digital Signal Processor);
- a ROM (or Read Only Memory) 1503;
- a RAM (or Random Access Memory) 1504;
- an I/O interface 1505 for reception of data to transmit, from an application; and
- a battery 1506

In accordance with an example, the battery 1506 is external to the device. In each of mentioned memory, the word «register» used in the specification can correspond to area of small capacity (some bits) or to very large area (e.g. a whole program or large amount of received or decoded data). The ROM 1503 comprises at least a program and parameters. The ROM 1503 may store algorithms and instructions to perform techniques in accordance with present principles. When switched on, the CPU 1502 uploads the program in the RAM and executes the corresponding instructions.

RAM 1504 comprises, in a register, the program executed by the CPU 1502 and uploaded after switch on of the device 1500, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the block Bc of video data or syntax element or the sequence of binary symbols is obtained from a source. For example, the source belongs to a set comprising:
- a local memory (1503 or 1504), e.g. a video memory or a RAM (or Random Access Memory), a flash memory, a ROM (or Read Only Memory), a hard disk;
- a storage interface (1505), e.g. an interface with a mass storage, a RAM, a flash memory, a ROM, an optical disc or a magnetic support;
- a communication interface (1505), e.g. a wireline interface (for example a bus interface, a wide area network interface, a local area network interface) or a wireless interface (such as a IEEE 802.11 interface or a Bluetooth® interface); and
- an picture capturing circuit (e.g. a sensor such as, for example, a CCD (or Charge-Coupled Device) or CMOS (or Complementary Metal-Oxide-Semiconductor)).

In accordance with an example of the decoding or a decoder, the decoded data is sent to a destination; specifically, the destination belongs to a set comprising:
- a local memory (1503 or 1504), e.g. a video memory or a RAM, a flash memory, a hard disk;
- a storage interface (1505), e.g. an interface with a mass storage, a RAM, a flash memory, a ROM, an optical disc or a magnetic support;
- a communication interface (1505), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface); and
- a display.

In accordance with examples of encoding or encoder, the bit-stream is sent to a destination. As an example, the bit-stream is stored in a local or remote memory, e.g. a video memory (1504) or a RAM (1504), a hard disk (1503). In a variant, the bit-stream is sent to a storage interface (1505), e.g. an interface with a mass storage, a flash memory, ROM, an optical disc or a magnetic support and/or transmitted over a communication interface (1505), e.g. an interface to a point to point link, a communication bus, a point to multipoint link or a broadcast network.

In accordance with examples of decoding or decoder, the bit-stream is obtained from a source. Exemplarily, the bit-stream is read from a local memory, e.g. a video memory (1504), a RAM (1504), a ROM (1503), a flash memory (1503) or a hard disk (1503). In a variant, the bit-stream is received from a storage interface (1505), e.g. an interface with a mass storage, a RAM, a ROM, a flash memory, an optical disc or a magnetic support and/or received from a communication interface (1505), e.g. an interface to a point to point link, a bus, a point to multipoint link or a broadcast network.

In accordance with examples, device 1500 being configured to implement an method described in relation with FIG. 1-14, belongs to a set comprising:
- a mobile device;
- a communication device;
- a game device;
- a tablet (or tablet computer);
- a laptop;
- a still picture camera;
- a video camera;
- an encoding chip;
- a still picture server;
- a video server (e.g. a broadcast server, a video-on-demand server or a web server);
- a set top box;
- a TV set;
- a display and
- a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for context-adaptive binary arithmetic coding or decoding a binary symbol representing a syntax element related to picture data of a picture block, said method comprising:
when a size of said picture block is a power of 2, arithmetic-coding or decoding said binary symbol as a function of a context determined according to the size of said picture block; and
when the size of said picture block is not a power of 2, arithmetic-coding or decoding said binary symbol as a function of a context determined according to a block size immediately higher or lower than the size of said picture block, said block size being equal to a power of 2.

2. The method of claim 1, wherein (i) the block size is either the width or the height of said block or (ii) the size of the picture block is either the width or the height of said picture block.

3. The method of claim 1, wherein a context is determined according to either the size of the picture block or the block size immediately higher or lower than the size of said picture block by:
obtaining at least one set of contexts according to different picture block sizes equal to powers of 2, each set of contexts being obtained for a picture block size that equals to a particular power of 2;
checking whether the size of the picture block is a power of 2;
if the size of said picture block is a power of 2, selecting a first set of contexts, from among said at least one obtained set of contexts, according to the size of said picture block;
else selecting a second set of contexts, from among said at least one obtained set of contexts, according to the block size immediately higher or lower than the size of said picture block, said block size being equal to a power of 2; and
determining a context from among said selected set of contexts according to an index of the binary symbol in a sequence of binary symbols.

4. The method of claim 3, wherein said syntax element related to the picture data represents one of spatial coordinates of a last significant coefficient belonging to said picture block when said picture block is scanned according to a scanning order, the method further comprising:
selecting an interval index identifying an interval of integer values, from among a set of at least one interval index, in which said one of the spatial coordinates of the last significant coefficient belongs;
obtaining said sequence of binary symbols by binarizing said selected interval index; and
coding each bin of said sequence of binary symbols.

5. The method of claim 4, wherein the method further comprises obtaining an offset value within said selected interval in order that said one of the spatial coordinates of the last significant coefficient is lossless as represented by said interval index and said offset value.

6. The method of claim 1, wherein said picture block is split into at least two picture sub-blocks, wherein said syntax element related to the picture data represents a significant coefficient flag relative to a coefficient of one of said at least two picture sub-blocks, and wherein a context is determined according to either the size of the picture block or the block size immediately higher or lower than the size of said picture block by:
checking whether the size of the picture block is a power of 2;
if the size of said picture block is a power of 2, determining a base context index according to the size of said picture block;
else determining a base context index according to the block size immediately higher or lower than the size of said picture block, said block size being equal to a power of 2; and
determining a context index of said context by adding said base context index to a context increment obtained from significant transform coefficient flags of neighboring coefficients.

7. The method of claim 6, wherein (i) the size of said picture block is at least one of the width and the height of said picture block or (ii) a size of said picture sub-block is at least one of the width and the height of said picture sub-block, and wherein the method further comprises obtaining said picture block or said picture sub-block, at least one of the height and the width of said picture block or said picture sub-block being equal to a product of an integer value multiplied by a power of 2 so that said product is not a power of 2.

8. The method of claim 7, wherein obtaining said picture block comprises splitting a parent block into two sub-blocks each having at least one of the height and the width equal to said product.

9. A device for context-adaptive binary arithmetic coding or decoding a binary symbol representing a syntax element related to picture data of a picture block, said device comprising at least one processor configured for:
when a size of said picture block is a power of 2, arithmetic-coding or decoding said binary symbol as a function of a context determined according to the size of said picture block; and
when the size of said picture block is not a power of 2, arithmetic-coding or decoding said binary symbol as a function of a context determined according to a block size immediately higher or lower than the size of said picture block, said block size being equal to a power of 2.

10. The device of claim 9, wherein (i) the block size is either the width or the height of said block or (ii) the size of the picture block is either the width or the height of said picture block.

11. The device of claim 9, wherein a context is determined according to either the size of the picture block or the block size immediately higher or lower than the size of said picture block by:
obtaining at least one set of contexts according to different picture block sizes equal to powers of 2, each set of contexts being obtained for a picture block size that equals to a particular power of 2;
checking whether the size of the picture block is a power of 2;
if the size of said picture block is a power of 2, selecting a first set of contexts, from among said at least one obtained set of contexts, according to the size of said picture block;
else selecting a second set of contexts, from among said at least one obtained set of contexts, according to the block size immediately higher or lower than the size of said picture block, said block size being equal to a power of 2; and determining a context from among said selected set of contexts according to an index of the binary symbol in a sequence of binary symbols.

12. The device of claim 11, wherein said syntax element related to the picture data represents one of spatial coordinates of a last significant coefficient belonging to said picture block when said picture block is scanned according to a scanning order, and wherein said at least one processor is further configured for:
selecting an interval index identifying an interval of integer values, from among a set of at least one interval index, in which said one of the spatial coordinates of the last significant coefficient belongs;
obtaining said sequence of binary symbols by binarizing said selected interval index; and
coding each bin of said sequence of binary symbols.

13. The device of claim 12, wherein said at least one processor is further configured for obtaining an offset value within said selected interval in order that said one of the spatial coordinates of the last significant coefficient is lossless as represented by said interval index and said offset value.

14. The device of claim 9, wherein said picture block is split into at least two picture sub-blocks, wherein said syntax element related to the picture data represents a significant coefficient flag relative to a coefficient of one of said at least two picture sub-blocks, and wherein a context is determined according to either the size of the picture block or the block size immediately higher or lower than the size of said picture block by:
checking whether the size of the picture block is a power of 2;
if the size of said picture block is a power of 2, determining a base context index according to the size of said picture block;
else determining a base context index according to the block size immediately higher or lower than the size of said picture block, said block size being equal to a power of 2; and
determining a context index of said context by adding said base context index to a context increment obtained from significant transform coefficient flags of neighboring coefficients.

15. The device of claim 14, wherein (i) the size of said picture block or (ii) a size of said picture sub-block is at least one of the width and the height of said picture sub-block, and wherein the method further comprises obtaining said picture block or said picture sub-block, at least one of the height and the width of said picture block or said picture sub-block being equal to a product of an integer value multiplied by a power of 2 so that said product is not a power of 2.

16. The device of claim 15, wherein obtaining said picture block comprises splitting a parent block into two sub-blocks each having at least one of the height and the width equal to said product.

17. A non-transitory computer-readable medium including instructions for causing one or more processors to perform a method for context-adaptive binary arithmetic coding or decoding a binary symbol representing a syntax element related to picture data of a picture block comprising:
when a size of said picture block is a power of 2, arithmetic-coding or decoding said binary symbol as a function of a context determined according to the size of said picture block; and
when the size of said picture block is not a power of 2, arithmetic-coding or decoding said binary symbol as a function of a context determined according to a block size immediately higher or lower than the size of said picture block, said block size being equal to a power of 2.

18. The non-transitory computer-readable medium of claim 17, wherein (i) the block size is either the width or the height of said block or (ii) the size of the picture block is either the width or the height of said picture block.

19. The non-transitory computer-readable medium of claim 17, wherein a context is determined according to either the size of the picture block or the block size immediately higher or lower than the size of said picture block by:
obtaining at least one set of contexts according to different picture block sizes equal to powers of 2, each set of contexts being obtained for a picture block size that equals to a particular power of 2;
checking whether the size of the picture block is a power of 2;
if the size of said picture block is a power of 2, selecting a first set of contexts, from among said at least obtained set of contexts, according to the size of said picture block;
else selecting a second set of contexts, from among said at least one obtained set of contexts according to the block size immediately higher or lower than the size of said picture block, said block size being equal to a power of 2; and
determining a context from among said selected set of contexts according to an index of the binary symbol in a sequence of binary symbols.

20. The non-transitory computer-readable medium of claim 17, wherein said picture block is split into at least two picture sub-blocks, wherein said syntax element related to picture data represents a significant coefficient flag relative to a coefficient of one of said at least two picture sub-blocks, and wherein a context is determined according to either the size of the picture block or the size immediately higher or lower than the size of said picture block by:
checking whether the size of the picture block is a power of 2;
if the size of said picture block is a power of 2, determining a base context index according to the size of said picture block;
else determining a base context index according to the block size immediately higher or lower than the size of said block size being equal to a power of 2; and
determining a context index of said context by adding said base context index to a context increment obtained from significant transform coefficient flags of neighboring coefficients.

* * * * *

UNITED STATES PATENT AND TRADEMARK OFFICE
CERTIFICATE OF CORRECTION

| | | |
|---|---|---|
| PATENT NO. | : 11,006,116 B2 | |
| APPLICATION NO. | : 16/340064 | |
| DATED | : May 11, 2021 | |
| INVENTOR(S) | : Fabrice Leleannec, Gagan Rath and Fabrice Urban | |

It is certified that error appears in the above-identified patent and that said Letters Patent is hereby corrected as shown below:

On the Title Page

In the Abstract:
Item (57), Abstract, first Line, delete "an" and insert --and--

In the Claims

At Column 24, Line 27, Claim 19, after "at least" insert --one--

At Column 24, Line 44, Claim 20, after "or the" insert --block--

At Column 24, Line 52, Claim 20, after "size of" insert --said picture block--

Signed and Sealed this
Second Day of January, 2024

*Katherine Kelly Vidal*
Katherine Kelly Vidal
*Director of the United States Patent and Trademark Office*